June 24, 1969 L. J. REED ET AL 3,451,128
METHOD OF MAKING FINE LINE PATTERNS USING
A FERROMAGNETIC ELEMENT
Filed Dec. 30, 1964 Sheet 1 of 2
FIG. I
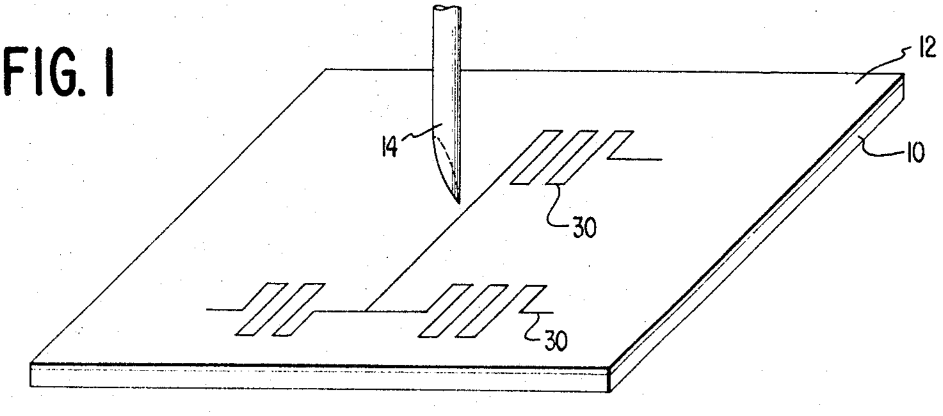
FIG. 2
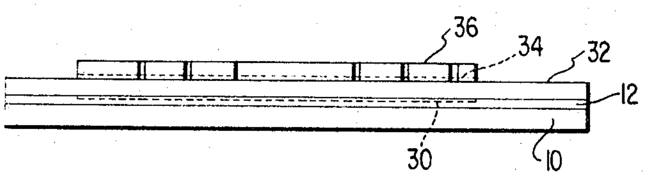
FIG. 3
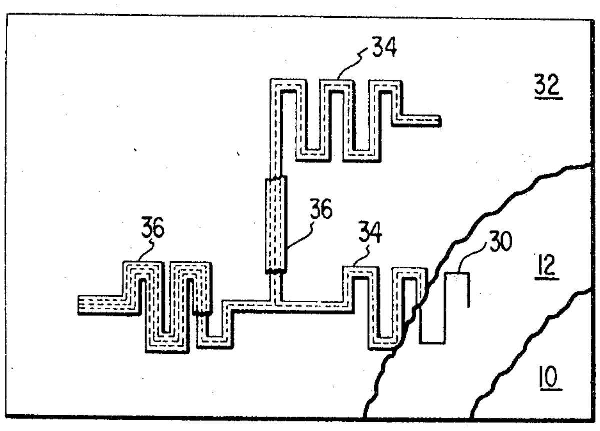
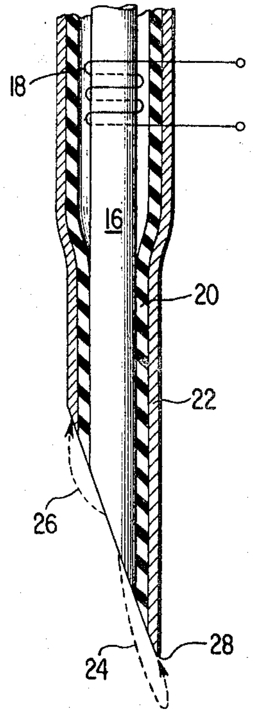
FIG. 4
INVENTORS.
LEONARD J. REED
JOHN R. MORRISON
BY Sughrue, Rothwell, Mion, Zinn & Macpeak
ATTORNEYS.

United States Patent Office 3,451,128

Patented June 24, 1969

3,451,128

METHOD OF MAKING FINE LINE PATTERNS USING A FERROMAGNETIC ELEMENT

Leonard J. Reed, Poughkeepsie, and John R. Morrison, Wappingers, N.Y., assignors to International Business Machines Corporation, New York, N.Y., a corporation of New York Filed Dec. 30, 1964, Ser. No. 422,359

Int. Cl. H01f *7/06;* C23b *5/48*

U.S. Cl. 29—604 6 Claims

ABSTRACT OF THE DISCLOSURE

Articles characterized by fine line patterns, such as printed circuit connections, are formed by initially tracing the fine line pattern on the surface of a high rententivity ferromagnetic material in the form of a line pattern of magnetic flux. An insulating material placed over the ferromagnetic surface and exposed to magnetic particles results in a fine line of magnetic particles, corresponding to the line pattern of magnetic flux, being formed on the insulating material. The line pattern of magnetic particles may be plated to further improve the conductive properties. The extremely narrow cross-section of the external flux used to create the original line pattern of magnetic flux enables the production of articles having lines which are extremely thin.

This invention relates to a process for producing line patterns, particularly patterns composed of very fine lines, such as are found in micro-miniature circuitry. The previously employed techniques generally involve either etching or silk-screening. These two methods have been extended to their limits, as far as resolution and minimum line width are concerned.

One object of the invention is to extend the manufacture of fine line patterns, such as micro-miniature printed circuits, to a new range of resolution and minimum line width.

Another object is to provide a method for this purpose which is simple and inexpensive, as well as effective.

Still another object is to provide a process by which any number of copies of an original or master pattern can be made, in a very simply way.

The method comprises a sequence of steps, starting with a ferromagnetic element having substantial retentivity, such as the coating of a magnetic tape of the type used in the data processing art for storing information. In a surface zone of the ferromagnetic element, for example in the magnetic oxide coating of a magnetic tape, a magnetic line replica of the desired pattern is formed, for example by means of a magnetic probe capable of generating at the surface of the ferromagnetic element a field of such smallness of cross section as is required for the particular pattern. While producing no visible effect upon the ferromagnetic element, the field of the probe, where it intersects the ferromagnetic material, magnetizes the material in the line along which the probe is drawn forming a magnetic line replica of the pattern to be formed.

Next, in accordance with the principle of the invention, a thin insulating layer is placed over the surface of the ferromagnetic element bearing the magnetic line replica and the replica is developed by bringing the surface of the insulating layer into contact with fine magnetic particles; for example, by immersion in a magnetic colloid. When the replica is sufficiently developed it is generally plated, to improve its properties, for example, with a metal, to develop desired electrical properties. The insulating layer, with its developed, and generally plated replica may then be removed from the ferromagnetic element and is ready for use. The ferromagnetic element, with its original magnetic line replica, can then be used to make duplicate patterns, by repeating the process from the point of covering the ferromagnetic element with an insulating layer. In some cases the insulating layer, with its replica, may be left on the ferromagnetic element. This variation of the process is used particularly when an inexpensive ferromagnetic element, such as magnetic oxide tape, is used and duplicate patterns are not to be made by preserving the originally generated magnetic line pattern in the ferromagnetic element.

The invention will be described in greater detail, with reference to the accompanying drawing, in which:

FIG. 1 is a perspective diagrammatic view of a ferromagnetic element illustrating the first step of the process;

FIG. 2 is a digrammatic side elevation of the ferromagnetic element showing a facsimile of the pattern at a later stage of the process;

FIG. 3 is a plan view of the ferromagnetic element with pattern at the same stage as shown in FIG. 2;

FIG. 4 is a diagrammatic vertical section of an electromagnetic probe, such as can be used to generate a magnetic line pattern in the surface layer of the ferromagnetic element.

Figures 5A, 5B, 5C, 5D, 5E, 5F, 5G, 5H, 5I, 5J, 5K, 5L:
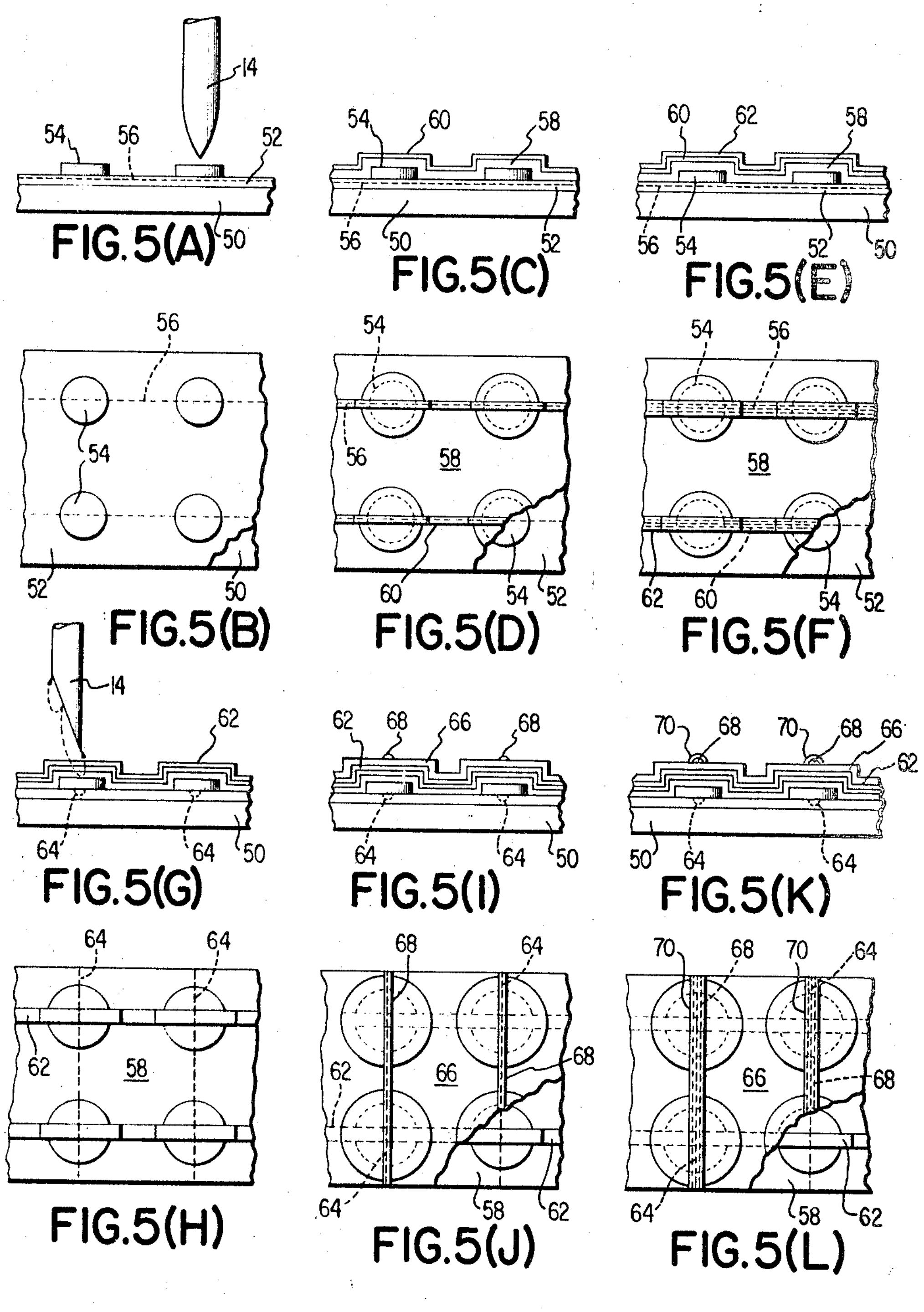

FIG. 5A–L is a group of diagrams in side elevation and plan view showing successive stages in the process of manufacturing a magnetic memory, in accordance with the invention.

Referring now to FIGS. 1–3, illustrating one process according to the invention, a ferromagnetic element is shown, in this case composed of a piece of magnetic oxide tape of the type used in data processing, comprising a magnetic oxide coating 12 on a plastic base 10. The coating is characterized by substantial retentivity, that is to say, when subjected to a magnetic field of sufficient strength it will be permanently magnetized where the field intersects it. As indicated in this figure, the field may be generated by a magnetic probe 14 having the general design shown, on an enlarged scale, in FIG. 4, and more fully disclosed in the copending application of Bate etc. A central ferromagnetic wire 16 is wrapped by a winding 18 having terminals by which a D.C. current can be passed through it. The core 16 is sheathed in an insulating layer 20, preferably applied by electroless plating. The sheath 20 is then plated with more ferromagnetic material 22. The end of the circular probe is lapped off to an angle of 80°, to provide a sharp-pointed end which will generate a magnetic field, when the coil 18 is energized, extending between the core 16 and shell 22 across the gap formed by the insulator 20. Because the gap is formed by the plated insulator, it can be made smaller than that of conventional recording heads (by limiting the plating time); that is, less than 50$\mu''$. Gaps approximately as small as 10$\mu''$ have been made. The ferromagnetic layer plated over the insulator is also less than 50$\mu''$. When the end of the probe has been lapped as shown the point 28 of the outer ferromagnetic layer is in the low $\mu''$ range in width, that is, less than 10$\mu''$. Since it is the flux gradient exterior to the probe that does the writing, and the flux is concentrated by the pointed configuration of the end of the probe, the effective writing cross section of the flux is less than the physical geometry of the gap or probe and may write a line less than 5$\mu''$ in width.

If the pattern to be produced is a micro-miniature circuit, for example, the movement of the probe is preferably accomplished by mounting it on a head which can be programmed for travel along two coordinate axes. Recorders of this type are well known and have not been shown in the drawing. When the probe has completed its movement over the surface of the ferromagnetic element the magnetic flux intersecting the surface of the layer 12 will have left in the surface portion a pattern of very fine magnetized lines, such as 30 forming a replica of the desired circuit.

The layer 12 is now covered with an insulating layer 32 (FIG. 2). Since, in the process being described, this layer will later be removed from the magnetic tape, it is preferably an extremely thin plastic layer, of the type commercially available under the trademark Saran Wrap, which has the advantage that it adheres tightly to the magnetic tape when laid upon it. Alternatively, the magnetic coating of the tape can be covered with a thin film of vaseline and a strip of another commercially known plastic sheet sold under the trademark Mylar laid upon it. Other means for covering a ferromagnetic material with an insulatig covering can be used, so long as the coating will remain in a fixed position on the ferromagnetic member during the further steps of the process to be described.

The next step is to develop the magnetic lines of the pattern, by bringing the insulating layer into contact with magnetic particles. The preferred way of performing this step is to submerge the sandwich of ferromagnetic element and insulating coating in a magnetic colloid. A suitable colloid for this purpose is one described by Craik and Griffiths in British Journal of Applied Physics, Man., 280 (1958). When a thin visible line 34 of magnetic material deposited from the colloid has formed on the layer 12 the sandwich is removed from the colloid. The line 34 appears continuous, when viewed under the microscope, but generally it is desirable to improve its properties by plating another substance onto it, as shown at 36, generally a metal, to improve both the physical and electrical properties of the lines forming the replica of the desired circuit pattern.

The plating may be done by either an electroless or electroplating operation. For electroless or chemical deposition of copper, for example, a typical plating solution would be:

| | Oz./gal. |
|---|---|
| Rochelle salt | 13.3 |
| Copper sulfate | 4 |
| Caustic soda | 5.3 |
| Formaldehyde (37%) | 4 |

condition: at room temperature.

Other metals, such as silver and gold, can be plated on by chemical deposition in a similar way.

A still greater variety of deposits can be achieved by electroplating. For example, a typical copper electrodeposition solution would be:

| | Oz./gal. |
|---|---|
| Copper sulfate | 33.0 |
| Sulfuric acid | 1.5 |
| Thiourea | .0001 |
| Wetting agent | .027 |

Operating conditions:
Temp.—60–120° F.
Current density—20 amperes per sq. ft. of area.

When the desired physical properties of the pattern have been achieved the insulating layer can be stripped off of the ferromagnetic substrate and prepared for use by any desired additional steps.

If a duplicate replica is to be made the process is repeated by covering the ferromagnetic element with another insulating layer and proceeding as above-described. Since the original magnetic line replica remains in the ferromagnetic element its can be developed on the new insulating layer as before. The process can be repeated indefinitely.

In the process just described it is evident that one may start by initially placing on the ferromagnetic element an insulating layer and then drawing a line with the magnetic probe to form a replica of a pattern.

As another example of utilization of the process there will now be described a method of making a memory plane of the type used in magnetic storage memories for data processing machines. One form of such a memory plane comprises a substrate on which are placed thin film dots of ferromagnetic material having special magnetic properties, the dots being arranged in a matrix consisting of rows and columns. Extending over each row of thin film dots is a conductor called a horizontal drive line; over each column of dots extends a conductor called a vertical drive line. The two sets of drive lines are insulated from each other so that electric currents can be passed through individual pairs of one horizontal and one vertical drive line, selectively, for producing effects by magnetic induction in selected ones of the thin film dots. It is such a thin film memory plane that will be produced by the process about to be described, with reference to FIG. 5A–L. In this figure there is a pair of views, namely, a side-elevational diagram and a plan view diagram, depicting the condition of the memory plane at various stages of the process. Starting with the stage depicted in views 5A and 5B, a magnetic tape comprising a plastic base 50 coated with a magnetic oxide layer 52 has placed upon the oxide layer an array of thin film magnetic dots 54. Only four dots are shown, but these are sufficient to illustrate the arrangement of the dots in horizintal rows and vertical columns. The actual number of dots in each row and each column will depend upon the design of the memory plan to be produced.

Next, parallel lines are "written" in the magnetic oxide coating by passing a magnetic probe 14 along the tape so as to cross diametrically over the spots constituting the different horizontal rows. The flux from the probe will induce magnetic lines 56 in the oxide coating, continuous from end to end of each row, and a little beyond for termination. The extent to which the dots themselves will also be magnetized along the lines will depend upon the coercive force of the ferromagnetic material of which they are composed.

Turning now to views C and D, the next step is to place over the magnetic tape and thin film dots an insulating layer 58, forming a two-layer sandwich. This is conveniently done by evaporating silicon monoxide onto the entire surface. Instead of first writing the the magnetic lines and then applying the insulating layer, these steps can be reversed in order. In either case, the next procedure is to develop the magnetic lines by bringing the surface of the layer 58 into contact with magnetic particles. Again, this is done most satisfactorily by submerging the sandwich in a magnetic colloid. The developed line then appears on the surface of the insulator, as shown at 60.

The next step, shown in views E and F, is to plate the developed lines 60, to produce the desired physical and electrical properties for the drive lines. The plated layers on the magnetic lines 60 are shown at 62. The horizontal drive lines are now complete. Next, the ferromagnetic oxide coating is demagnetized by applying an A-C field to it, so that there remain no magnetic lines.

Now vertical drive lines 64 are written onto the ferromagnetic oxide coating, as shown in views G and H, by passing the magnetic probe 14 over the vertical rows of dots. Either before or after this is done the whole surface is again coated with an insulating layer, for example by evaporating onto it silicon monoxide, as shown at 66 in the view I. Now the vertical magnetic lines are developed as shown at 68 in views I and J, by submerging the element in a magnetic colloid.

Finally, the physical properties of the developed vertical drive lines are improved, as shown in views K and L, by plating onto them a coating 70. Then all magnetic lines of the memory plate are erased.

The basic structure of the memory plane is now complete. Other electrical lines, such as sense windings, can be produced on the plane by following the same steps previously described. The whole plane can also be covered with any desired protective covering when its electrical structure has been completed.

The process of the invention has been illustrated by two examples. These can be multiplied without limit. It is evident that the process is characterized by great simplicity and economy, whether it utilizes the unlimited duplication of the first method described, or the progressive build-up of the second method.

The process is not limited to the particular examples described, its scope being limited only as indicated in the following claims.

What is claimed is:

1. The method of producing printed circuits having crossing circuit lines which comprises:

(1) selectively magnetizing the surface area of a ferromagnetic element having substantial retentivity to generate a first line pattern of magnetic flux which is a replica of a first portion of said circuit lines;

(2) covering said surface zone with an adhering thin insulating layer;

(3) developing said line pattern by magnetically securing fine magnetic particles to the portion of said insulating layer intersected by said first line pattern of magnetic flux;

(4) erasing said first line pattern of magnetic flux;

(5) selectively magnetizing said surface area of said ferromagnetic element to generate a second line pattern of magnetic flux which is a replica of a second portion of said circuit lines which cross said first portion of circuit lines;

(6) covering said insulating layer and the developed image thereon with an adhering second insulating layer; and (7) developing said second line pattern by magnetically securing fine magnetic particles to the portion of said second insulating layer intersected by said second line pattern of magnetic flux.

2. The method described in claim 1, wherein the development of the magnetic line replica of each part of the circuit is accomplished by bringing the exposed surface of the respective insulating layer into contact with a magnetic colloid.

3. The method described in claim 1, wherein the replicas developed on each of said insulating layers are plated with another substance to improve their properties.

4. The method of making a thin film memory device, which comprises:

(1) securing to a surface of a ferromagnetic element having substantial retentivity thin film dots of a material having special magnetic properties, the dots being arranged in a matrix of rows and columns;

(2) selectively magnetizing the surface area of said element to generate a first set of continuous, parallel fine lines of magnetic flux in a surface zone of said element, one line for each row of said dots, each line crossing all of the dots of its related row;

(3) covering the said element and the dots thereon with an adhering thin insulating layer;

(4) developing said lines on said insulating layer by magnetically securing fine magnetic particles to the portion of said insulating layer overlying said first set of fine lines;

(5) erasing said first set of lines of magnetic flux;

(6) selectively magnetizing the surface area of said element to generate a second set of continuous, parallel, fine lines of magnetic flux in said surface zone of said element, one line for each column of said dots, each of said second set of lines crossing all of the dots in its related column; and (7) developing said lines on said insulating layer by magnetically securing fine magnetic particles to the portion of said insulating layer overlaying said first set of fine lines.

5. The method described in claim 4, wherein each of said sets of lines, after it is developed, is plated with another substance to improve its properties.

6. The method described in claim 4, wherein said fine magnetic lines are developed by immersing the assembled ferromagnetic element and insulating layers in a magnetic colloid.

References Cited

UNITED STATES PATENTS

| | | | |
|---|---|---|---|
| 2,881,073 | 4/1959 | Maclay | 274—41.4 XR |
| 2,996,575 | 8/1961 | Sims | 101—426 XR |
| 3,120,806 | 2/1964 | Supernowicz | 117—17.5 XR |

JOHN F. CAMPBELL, *Primary Examiner.*

ROBERT W. CHURCH, *Assistant Examiner.*

U.S. Cl. X.R.

29—407, 603, 626, 625; 95—1.7; 101—426; 117—17.5, 37, 212; 174—68.5; 179—100.2; 204—15, 29; 340—174